Patented May 26, 1936

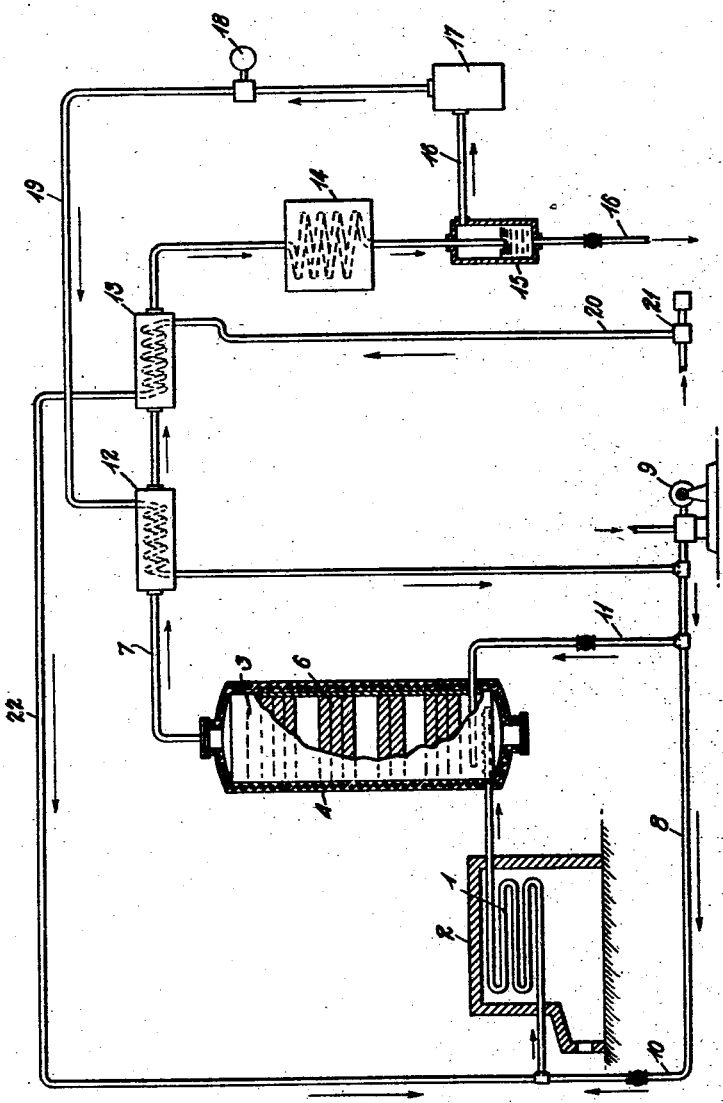

2,042,298

UNITED STATES PATENT OFFICE 2,042,298

PROCESS FOR THE PURIFICATION AND DESULPHURIZATION OF LOW BOILING DISTILLATES

Garland H. B. Davis, Baton Rouge, La., assignor to Standard-I. G. Company, a corporation of Delaware Application August 31, 1929, Serial No. 389,680

7 Claims. (Cl. 196—24)

The present invention relates to an improved process for the treatment of light hydrocarbon distillates and more specifically comprises a method for treating natural or cracked gasoline or naphtha distillate with hydrogen under high pressure. My invention will be fully understood from the following description and the drawing which illustrates one form of apparatus constructed according to my invention.

The drawing is a semi-diagrammatic view in sectional elevation of an apparatus for carrying out my process and indicates the flow of materials.

In a co-pending application Serial No. 389,628, filed August 31, 1929, in the name of James M. Jennings, a process for the treatment of natural and cracked naphtha among other oils with high pressure hydrogen is disclosed. Jennings discloses the fact that such oils may be purified at temperatures below 750° F. in the general range in which there is little or no decomposition of the oil. I have discovered, however, that the hydrogenation or elimination of impurities, for example sulphur or sulphur compounds, is much more rapid at temperatures above 750° F. than below in the range covered by Jennings. I have found that the rate of hydrogenation or elimination of impurities increases rapidly above 750° F. and appears to reach a maximum between about 790° and 850° F. and that if the oil is fed at a sufficiently rapid rate under suitable conditions, purification can be easily and quickly obtained at temperatures above 750° F. and below about 870° F.

Referring to the drawing reference numeral 1 denotes a heating coil arranged in a furnace setting 2 and adapted to heat a rapidly flowing stream of oil and gas to a high temperature. The coil discharges into a reaction chamber 3 which is constructed to withstand temperatures of 500° to 800° F. and pressures of several hundred atmospheres as well as the corrosive effect of the reactants. The chamber or oven 3 is covered with an insulating layer 4 and may be heated in any suitable manner such as by electrical means (not shown) but generally the heat added in coil 1 is sufficient.

The reaction chamber is packed with a suitable catalytic material 6 to be disclosed below, arranged on trays or grids (not shown) or otherwise supported so that the incoming material passes over or through the catalytic layer before finding exit by line 7.

Hydrogen or a gas rich in free hydrogen is forced under high pressure through a pipe 8 by compressor 9 and thence by branch lines 10 and 11 respectively into the inlet of coil 1 and directly into reactor 3. The outgoing mixture of oil and hydrogen passes by pipe 7 to heat exchangers 12 and 13 and thence to cooler 14 and separation drum 15. The oil is removed from the drum to storage (not shown) by line 16 while gas is separately drawn off to a purification system shown generally at 17 and which may comprise a scrubbing tower in which the gas is scrubbed with oil to remove substantial amounts of hydrogen sulphide and hydrocarbon constituents. Purified hydrogen is recompressed by booster pump 18 and then flows to exchanger 12 and line 8 by line 19. Fresh oil is forced through line 20 by pump 21 to exchanger 13 and thence by line 22 to heating coil 1.

In the operation of my process as indicated above the naphtha or distillate oil containing naphtha fractions is passed at a rapid rate through a catalytic reaction zone at a high temperature, for example between the limits of about 750 and 870° F. and preferably from 800° to 850° F., with a gas rich in free hydrogen. The pressure is in considerable excess of atmospheric pressure, say above 20 atmospheres but preferably above 100 or 200 atmospheres.

The rate of oil feed should in all cases be above about 1 to 1.5 volumes per hour per volume of reactor space. Higher feed rates are more desirable, however, especially as the temperature is increased. The best condition of velocity and temperature depend on the particular oil and the degree of purification desired. If the temperature is too high there is an excessive formation of gas and if too low, the impurities, such as sulphurous or gummy materials are not eliminated. It is a relatively simple matter to pick the most suitable conditions for each particular oil. Feed rate and temperature are so adjusted as to give a total recovery of liquid oil of 97% or better by volume of the feed.

While it is not necessary to use a catalyst in my process it is desirable and they are preferably sulphur resistant for example, oxides or sulphides of the sixth group of the periodic system of elements either alone or in mixtures with each other or with oxides of alkali or alkaline earth groups. Other oxides may be added such as rare earths, aluminum, zinc or the like and it is preferred to pack the reactor with lumps of the catalyst or to support the catalyst on trays or on refractory materials. The oil is cooled out of contact with air and after the gas is separated, is washed with alkali. Acid treatment is unnecessary although it is sometimes desirable to rerun.

The rate of gas flow should be in excess of 500 cubic feet per barrel of oil and preferably from 3,000 to 15,000 cubic feet per barrel of oil fed. This is in considerable excess of the quantity of gas entering into combination with the oil or its impurities.

With my process sulphur content of natural or cracked naphtha can be greatly reduced, for example from 0.395% in a cracked Smackover distillate to .006% in the gasoline, end point 400° F., derived therefrom. This same distillate before treatment with high pressure hydrogen is distilled to separate the naphtha, 400° F. end point and it shows the following characteristics:

| | | |
|---|---|---|
| Gravity | A. P. I. | 53.9° |
| Sulphur | per cent | .169 |
| Olefins | do | 24.5 |
| Aromatics | do | 8.5 |
| Naphthenes | do | 20.0 |
| Paraffins | do | 47.0 |
| Copper dish gum | mg. per 100 cc | 21 |
| Porcelain dish gum | do | 12 |

The naphtha is distilled from the treated oil, for comparison, to give a distillate of 400° F. end point. It has the following characteristics:

| | | |
|---|---|---|
| Gravity | A. P. I. | 59.3° |
| Sulphur | per cent | .006 |
| Olefins | do | 8.5 |
| Aromatics | do | 4.5 |
| Naphthenes | do | 31.7 |
| Paraffins | do | 55.3 |
| Copper dish gum | mg. per 100 cc | 3 |
| Porcelain dish gum | do | 2 |

The oil is much improved as to color stability on storage and shows little or no tendency to form gum in storage. The knock-rating, or tendency to suppress knocking in an internal combustion engine was not quite so strong as that of the untreated oil.

My invention is not to be limited by any theory of the operation of my process nor by any example given merely by way of illustration but only by the following claims in which I wish to claim all novelty inherent in my invention.

I claim:

1. An improved process for purification of hydrocarbon oils which comprises rapidly passing an oil containing fractions of a boiling range below kerosene through a reaction zone in contact with a gas rich in free hydrogen under pressure in excess of about 20 atmospheres and at a temperature above about 790° F. but below about 870° F. and adjusting temperature and rate of feed whereby the oil is purified without substantial decomposition.

2. An improved process according to claim 1 in which the pressure is in excess of 100 atmospheres.

3. Process according to claim 1 in which a sulfur resistant catalytic agent is used in the reaction zone.

4. Process for the purification of naphtha containing distillate containing sulphur and gum comprising passing such oil through a catalytic zone containing a sulfur resistant hydrogenation catalyst at a temperature between the limits of 790 and 870° F. and at a feed rate in excess of 1.5 volumes of oil per hour per volume of the catalytic zone, and adjusting temperature and feed rate whereby there is a substantial removal of sulphur and gum and a recovery of oil at least 97% by volume of that fed.

5. A process for the purification of low boiling hydrocarbon oil which comprises passing the oil through a reaction zone containing a sulfur resistant hydrogenation catalyst in contact with a gas rich in free hydrogen under pressure in excess of 20 atmospheres and at a temperature above about 790° F. and below about 870° F. at a rate in excess of about 1 volume of oil per volume of reaction space per hour.

6. A process for the purification of a distillate containing fractions suitable in boiling range for use as fuel in internal combustion engines, which comprises passing such oil together with a large excess of free hydrogen through a catalytic zone containing a sulfur resistant hydrogenation catalyst under pressure in considerable excess of atmospheric, at a temperature between 800 and 850° F., and at a rate in excess of about one volume of oil per volume of reaction space per hour.

7. A process for the purification of a distillate containing fractions suitable in boiling range for use as fuel in internal combustion engines, which comprises passing such oil together with a large excess of free hydrogen through a catalytic zone containing a sulfur resistant hydrogenation catalyst under pressure in considerable excess of atmospheric, at a temperature between 800 and 850° F., and at a feed rate such that there is a substantial elimination of sulfur and a recovery of at least 97% of the oil fed.

GARLAND H. B. DAVIS.